United States Patent

Wang et al.

[11] Patent Number: 5,668,740
[45] Date of Patent: Sep. 16, 1997

[54] METHOD FOR DETECTING A ROUGH ROAD SURFACE

[75] Inventors: Jenne-Tai Wang, Troy, Mich.; Richard Jay Yun, Marysville, Ohio

[73] Assignee: General Motors Corporation, Detroit, Mich.

[21] Appl. No.: 360,142

[22] Filed: Dec. 20, 1994

[51] Int. Cl.$^6$ ............................................. B60R 21/32
[52] U.S. Cl. .......................... 364/550; 364/566; 340/436; 307/10.1; 701/36; 701/70
[58] Field of Search ................. 364/550, 424.05, 364/426.01, 566; 340/436, 438; 307/10.1; 180/282; 280/735

[56] References Cited

U.S. PATENT DOCUMENTS

| | | | |
|---|---|---|---|
| 4,651,290 | 3/1987 | Masaki et al. | 364/550 |
| 4,837,727 | 6/1989 | Tashiro et al. | 364/551.01 |
| 4,979,763 | 12/1990 | Blackburn | 280/735 |
| 4,984,163 | 1/1991 | Kuwana et al. | 364/426.02 |
| 4,985,835 | 1/1991 | Sterler et al. | 364/424.05 |
| 5,062,657 | 11/1991 | Majeed | 280/707 |
| 5,062,658 | 11/1991 | Majeed | 364/424.05 |
| 5,071,157 | 12/1991 | Majeed | 364/424.05 |
| 5,096,219 | 3/1992 | Hanson et al. | 280/707 |
| 5,129,675 | 7/1992 | Wang | 280/743 |
| 5,219,177 | 6/1993 | Wang | 280/732 |
| 5,225,985 | 7/1993 | Okano | 364/424.05 |
| 5,339,242 | 8/1994 | Reid et al. | 364/424.05 |
| 5,394,326 | 2/1995 | Liu | 364/424.05 |
| 5,394,328 | 2/1995 | Huang | 364/669 |
| 5,418,722 | 5/1995 | Cashler | 364/424.05 |
| 5,436,838 | 7/1995 | Miyamori | 364/424.05 |
| 5,521,822 | 5/1996 | Wang | 364/424.05 |
| 5,559,697 | 9/1996 | Wang | 364/424.05 |

Primary Examiner—James P. Trammell
Assistant Examiner—Hien Vo
Attorney, Agent, or Firm—Howard N. Conkey

[57] ABSTRACT

A method for detecting a rough road surface upon which a vehicle is travelling, such detection being utilized by a crash sensing system for improving its immunity to inadvertent deployment during minor crash incidents. The onset of a crash event is sensed by an on-board accelerometer when the detected vehicle deceleration exceeds a predetermined deceleration threshold value. A rough road measurement is calculated as a function of the vehicle deceleration data and compared to a threshold boundary curve. A value of the rough road measurement exceeding the boundary curve is indicative of a rough road event.

1 Claim, 2 Drawing Sheets

METHOD FOR DETECTING A ROUGH ROAD SURFACE

The present invention relates to a method for detecting a rough road surface upon which a vehicle is travelling. It has particular application to vehicle crash sensing systems for improving immunity to rough road events which do not require actuation of a vehicle safety device, such as an airbag.

BACKGROUND OF THE INVENTION

A vehicle crash sensing system detects and discriminates severe crash events which require deployment of an airbag, from minor crash incidents which do not. Discrimination is accomplished by means of an on-board accelerometer and associated signal processing algorithm contained within a microprocessor. Since the total available time for deploying an airbag to effectively restrain occupants in a severe crash event is very short, the ability to quickly and reliably determine the severity of a collision is paramount. Equally important is system immunity to inadvertent deployment during minor crash incidents, one category of which are rough road events.

Prior art airbag deployment algorithms have been developed which utilize one or more quantities for measuring the severity of a collision. One such quantity is vehicle velocity change, calculated as an integral of vehicle deceleration data generated by the accelerometer. FIG. 1 illustrates a graph of vehicle velocity change curves for various types of rough road events. These events include 40 km/h pothole 10; 96 km/h chatterbumps 12; 48 km/h square block road 14; 9 km/h curb impact 16; and 32 km/h curb dropoff 18. FIG. 2 illustrates a graph of vehicle velocity change curves for various types of severe crash events. These events include a 30 mph frontal barrier 20; 30 mph, 30° angle barrier 22; 30 mph center pole 24; and 13 mph from barrier 26.

Comparing FIGS. 1 and 2, it can be observed that the vehicle velocity change curves of rough road events are much more "wavy" than those of severe crash events. Them is a desire to quantify the "waviness" or oscillatory content of vehicle velocity change curves for accurately detecting the presence of a rough road surface.

SUMMARY OF THE INVENTION

The present invention is directed to a method for detecting a rough road surface upon which a vehicle is travelling, such detection being utilized by crash sensing systems for improving their immunity to inadvertent deployment during minor crash incidents. According to the present invention, an on-board accelerometer provides an electrical signal responsive to vehicle deceleration. The onset of a crash event is determined when the vehicle deceleration signal value exceeds a predetermined deceleration threshold value. Following the onset of a crash event, vehicle deceleration signal data is sampled at predetermined time intervals (e.g., scan rate of the microprocessor). A rough wad measurement is calculated as a summation (e.g., integral) of the difference between the individual sampled vehicle deceleration signal data and an absolute value of the sampled data.

A value of the rough wad measurement exceeding a predetermined rough road boundary curve is indicative of an oscillatory vehicle velocity change curve, and therefore a rough road event.

DETAILED DESCRIPTION OF THE PREFERRED EMBODIMENT

Figure 3:
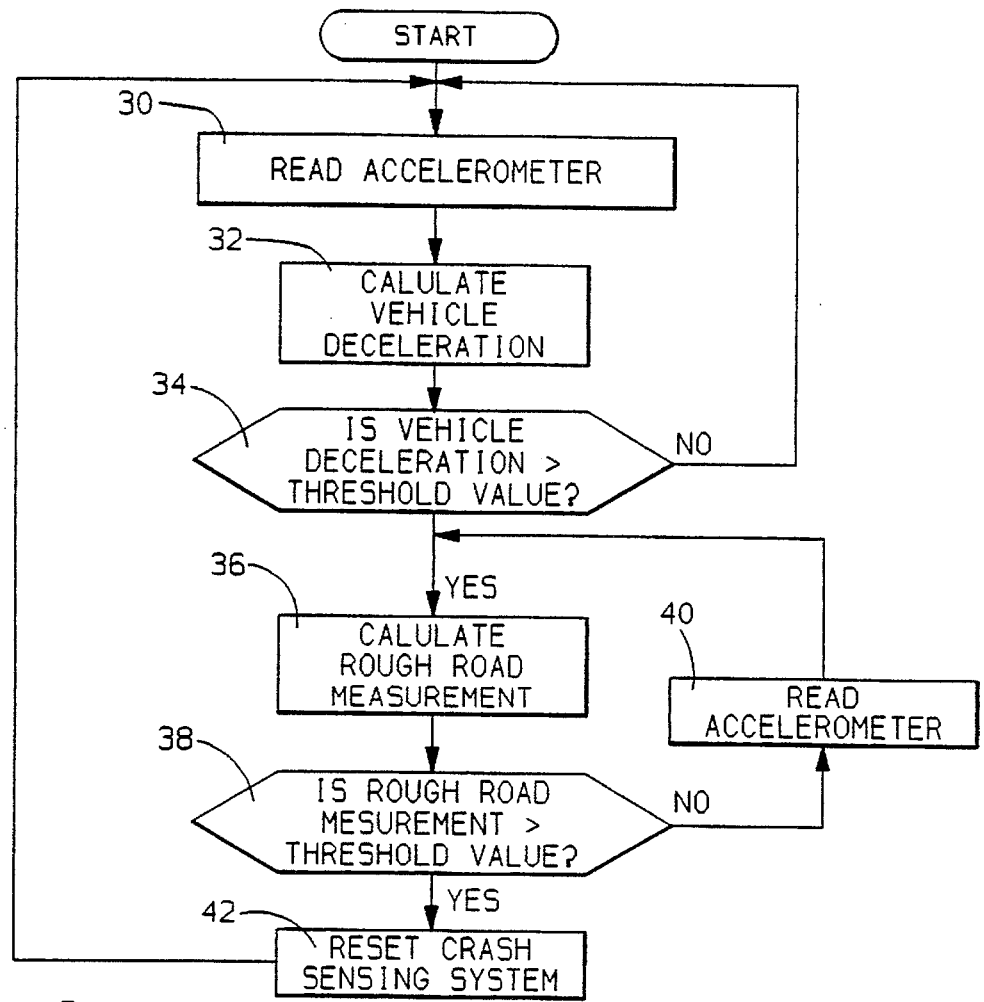
FIG. 3 illustrates a flow chart of computer instructions executed by a microprocessor in carrying out the method of the present invention.

Referring to the drawings, FIG. 3 illustrates a flow chart of computer instructions executed by a microprocessor in carrying out the method of the present invention. Referring to FIG. 3, the method begins at step 30 by sampling (at the scan rate of the microprocessor) signal dam provided by an on-board accelerometer (not shown) which is responsive to changes in vehicle velocity. At step 32, the data is used to compute vehicle deceleration a(t), which is compared in step 34 with a threshold deceleration value. If the vehicle deceleration exceeds the threshold deceleration value, a vehicle impact is assumed to have occurred and processing continues to determine whether or not the detected impact was the result of a rough road event. If an impact has not occurred, the microprocessor resamples the vehicle accelerometer at step 30 and repeats step 32 and 34.

If an impact has occurred, the microprocessor continues onto step 36 where a rough road measurement is performed. This measurement is calculated in accordance with the following formula:

$$RM = \int [|a(t)| - a(t)] dt \quad (1)$$

where a(t) is the time-based (sampled) vehicle deceleration signal data. In step 38, the rough road measurement is compared to a predetermined time-dependent rough road boundary curve threshold value. The values of the boundary curve are predetermined, as a function of the time after the onset of a crash event, to distinguish rough road events. Values exceeding the boundary curve are indicative of a rough road surface.

Upon detection of a rough road surface in step 38, step 42 provides an indication of a rough road surface. This indication can take one of several different forms. For example, it may comprise the setting of a flag in the microprocessor, or the storing of a value in a memory location for access by multiple vehicle control systems. Preferably, in response to this indication, the vehicle's crash sensing system is reset to prevent inadvertent deployment. Furthermore, the rough road surface detection method also resets, returning to step 30 for detection of the next vehicle impact.

Figure 1:
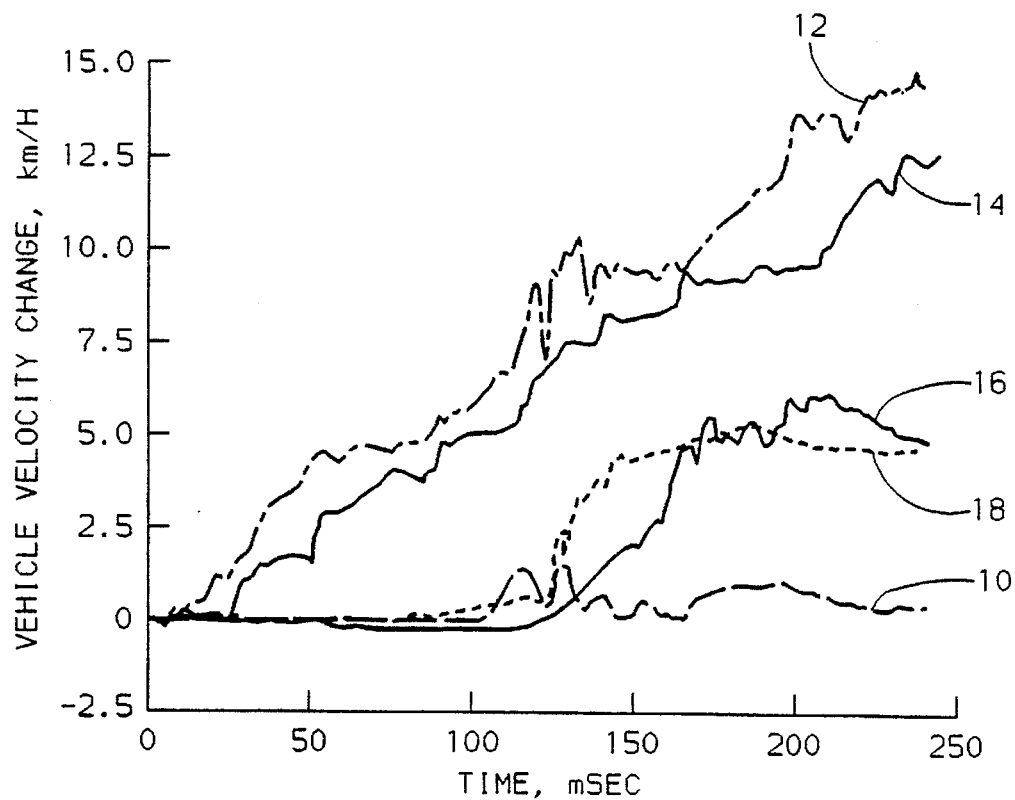
FIG. 1 illustrates a graph of changes in vehicle velocity vs. time for a series of severe crash events.
Figure 2:
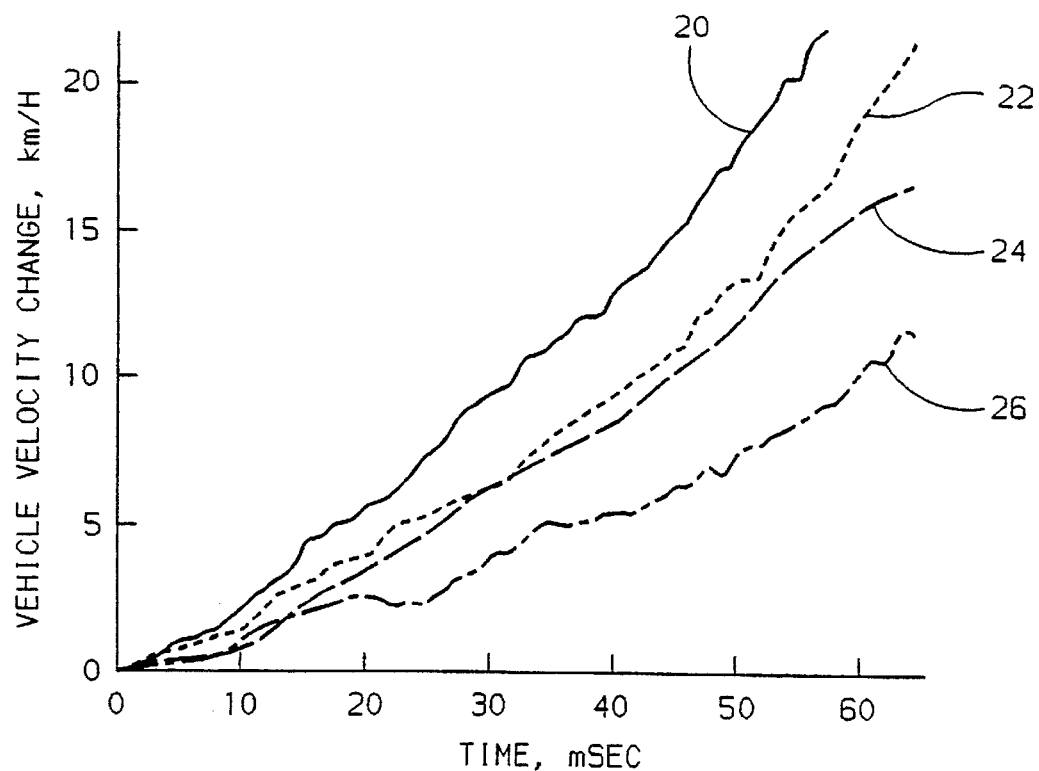
FIG. 2 illustrates a graph of changes in vehicle velocity vs. time for a series of rough road events.
Figure 4:
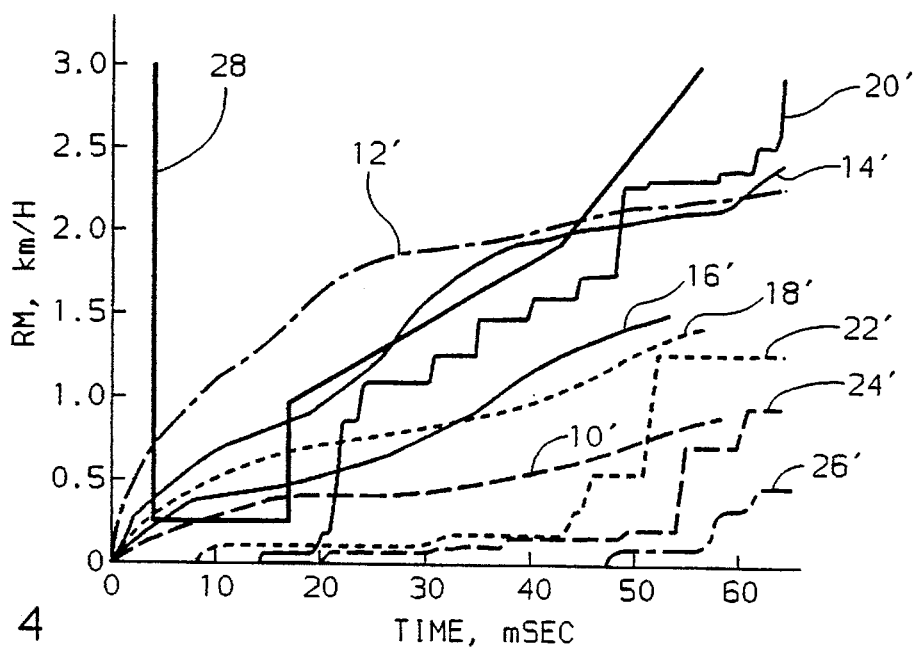
FIG. 4 illustrates a graph of rough road measurement values for various severe and rough road events.

FIG. 4 illustrates a graph of corresponding rough road measurements for the rough road and severe crash events illustrated in FIGS. 1 and 2. As noted above, the rough road events are identified as a 40 km/h pothole impact 10'; 96 km/h chatterbumps 12'; 48 km/h square block road impact 14'; 9 km/h curb impact 16'; and 32 km/h curb dropoff 18'. The severe crash events are identified as a 30 mph frontal barrier impact 20'; 30 mph, 30° angle barrier impact 22'; 30 mph center pole impact 24'; and 13 mph front barrier impact 26'.

The rough road boundary curve is designed such that only rough road events will generate a rough road measurement value exceeding the boundary curve after a sensed vehicle impact. Referring to FIG. 4, a rough road boundary curve 28 can be established whereupon only rough road measurement values for rough road events will exceed the boundary curve, thereby indicating a detected rough road surface. It can be observed that the rough road measurements of rough road events have significantly greater values within the first 10 msec after an impact than severe crash events. Thus, each of the rough road events can be detected within 10 msec after an impact through the use of the boundary curve 28 and the rough road measurement values of the present invention.

The method of the present invention can be incorporated into existing crash sensing systems for improving system immunity to inadvertent deployment during rough mad events.

While the present invention has been described in reference to the illustrated embodiments, it will be recognized that various modifications will occur to those skilled in the an. In this regard, it will be understood that the methods incorporating such modifications may fall within the scope of this invention, which is defined by the appended claims.

The embodiments of this invention in which an exclusive property or privilege is claimed are defined as follows:

1. A method for detecting a rough road surface upon which a vehicle is traveling, the method comprising:

providing a signal responsive to vehicle deceleration;

sampling the vehicle deceleration signal at a predetermined sampling rate to obtain discrete values of deceleration;

comparing discrete values of deceleration with a deceleration threshold to detect the onset of a crash event;

computing absolute values of the discrete values of deceleration;

determining difference values as a function of a difference between the absolute values and the discrete values of deceleration;

determining rough road measurement values as an integral of the difference values;

comparing the rough road measurement values with a predetermined time-dependent boundary curve; and indicating a rough road surface when the rough road measurement value exceeds a corresponding value of the boundary curve for the appropriate time into the crash event.

* * * * *